United States Patent [19]

Feisel

[11] Patent Number: 5,413,520

[45] Date of Patent: May 9, 1995

[54] METHOD AND APPARATUS FOR FINE MACHINING OF SPUR GEARS

[75] Inventor: Armin Feisel, Schaffhausen, Switzerland

[73] Assignee: Reishauer AG., Wallisellen, Switzerland

[21] Appl. No.: 928,444

[22] Filed: Aug. 12, 1992

[30] Foreign Application Priority Data

Aug. 28, 1991 [CH] Switzerland ................ 2519/91

[51] Int. Cl.⁶ .................................. B24B 49/00
[52] U.S. Cl. .................................. 451/1; 451/11; 451/28; 451/47; 451/119; 451/147
[58] Field of Search ............... 51/72 R, 73 R, 31, 32, 51/33 R, 33 W, 34 R, 44, 48, 52 R, 95 R, , 95 GH, 287, 165 R, 165.77, 165.8, 165.9; 451/1, 11, 14, 24, 47, 119, 120, 121, 123, 124, 136, 137, 140, 143, 147, 177, 178, 212, 213, 218, 219, 242, 2243, 246, 253

[56] References Cited

U.S. PATENT DOCUMENTS

| | | |
|---|---|---|
| 2,165,386 | 7/1939 | Klomp . |
| 2,685,234 | 8/1954 | Osplack . |
| 4,175,537 | 11/1979 | Wiener ................ 51/287 |
| 4,378,660 | 4/1983 | Wiener ................ 51/287 |
| 4,467,568 | 8/1984 | Bloch et al. ............ 51/287 |
| 4,630,404 | 12/1986 | Erhardt et al. ......... 51/287 |
| 4,811,528 | 3/1989 | Sommer ................ 51/287 |
| 4,815,239 | 3/1989 | Sommer ................ 51/165.77 |
| 5,079,877 | 1/1992 | Abysov ................ 51/287 |
| 5,136,522 | 8/1992 | Loehrke ............... 51/105 GG |

FOREIGN PATENT DOCUMENTS

| | | |
|---|---|---|
| 1296486 | 5/1969 | Germany . |
| 864688 | 4/1961 | United Kingdom . |
| 2018178 | 10/1979 | United Kingdom . |
| 2151520 | 7/1985 | United Kingdom . |

*Primary Examiner*—Maurina T. Rachuba
*Attorney, Agent, or Firm*—Sughrue, Mion, Zinn, Macpeak & Seas

[57] ABSTRACT

The conical internal teeth (7) of a spur gear grinding tool (2) mesh with the teeth (6) of a spur gear workpiece (1) or a dressing spur gear. The tool axis (4) forms an acute angle ($\gamma$) with the workpiece axis (3). To grind and to dress, the spur gear tool (2) is fed relative to the workpiece (1) in the direction of the tool axis (4). In this manner an optimal tooth meshing between the tool (2) and the workpiece (1) over a wide dressing range and a constant finishing are achieved.

11 Claims, 2 Drawing Sheets

METHOD AND APPARATUS FOR FINE MACHINING OF SPUR GEARS

BACKGROUND OF THE INVENTION

Machines exist for the fine machining of the tooth flanks of spur gears, in which a spur gear tool, which is made of an abrasive compound in a bonded matrix and which can have internal or external teeth, meshes with a spur gear workpiece. The removal on the flanks of the spur gear occurs by driving the tool or the workpiece and at the same time feeding radially. The spur gear tool is fitted or dressed beforehand with its own tool, e.g. a diamond coated dressing spur gear. Normally the axes of the tool and spur gear workpiece are not parallel, but rather crossed, so that even in the pitch circle the axial component still results in a relative movement and thus removal of material. With a dull or inaccurately shaped spur gear tool, the re-profiling is done by means of a radial infeed movement of the dressing spur gear.

The dressing operation changes the diameter of the spur gear tool, and in particular an externally toothed wheel becomes smaller and an internally toothed wheel becomes larger. This change in the diameter is equivalent to a profile displacement of the spur gear tool. Since, however, a profile displacement with undisturbed meshing of the teeth is geometrically possible only in a limited range which is dependent primarily on the number of teeth and the meshing angle, the spur gear tool can only be utilized in a narrow diameter range.

Another drawback of this fine machining process follows from the displacement of the point of contact on the spur gear workpiece as a consequence of the continuous, dressing-induced profile change or displacement of the spur gear tool. The relative speeds between the spur gear workpiece and tool thus change, as do the removal rate and in particular the tool marks on the tooth flank, rendering a constant finishing dubious or at least making it difficult.

SUMMARY OF THE INVENTION

To overcome these drawbacks and disadvantages in accordance with the invention, a spur gear workpiece is mounted on a workpiece spindle, and its teeth mesh with the internal teeth of a conical spur gear grinding tool mounted on a tool spindle. The workpiece and tool axes cross at an acute angel $\gamma$, and the tool is fed in the direction of its axis to implement a uniform fine machining or finishing of the workpiece teeth. The conicity of the grinding tool enables its successive or progressive dressing without altering its working profile.

DETAILED DESCRIPTION OF THE PREFERRED EMBODIMENT

Figure 1:
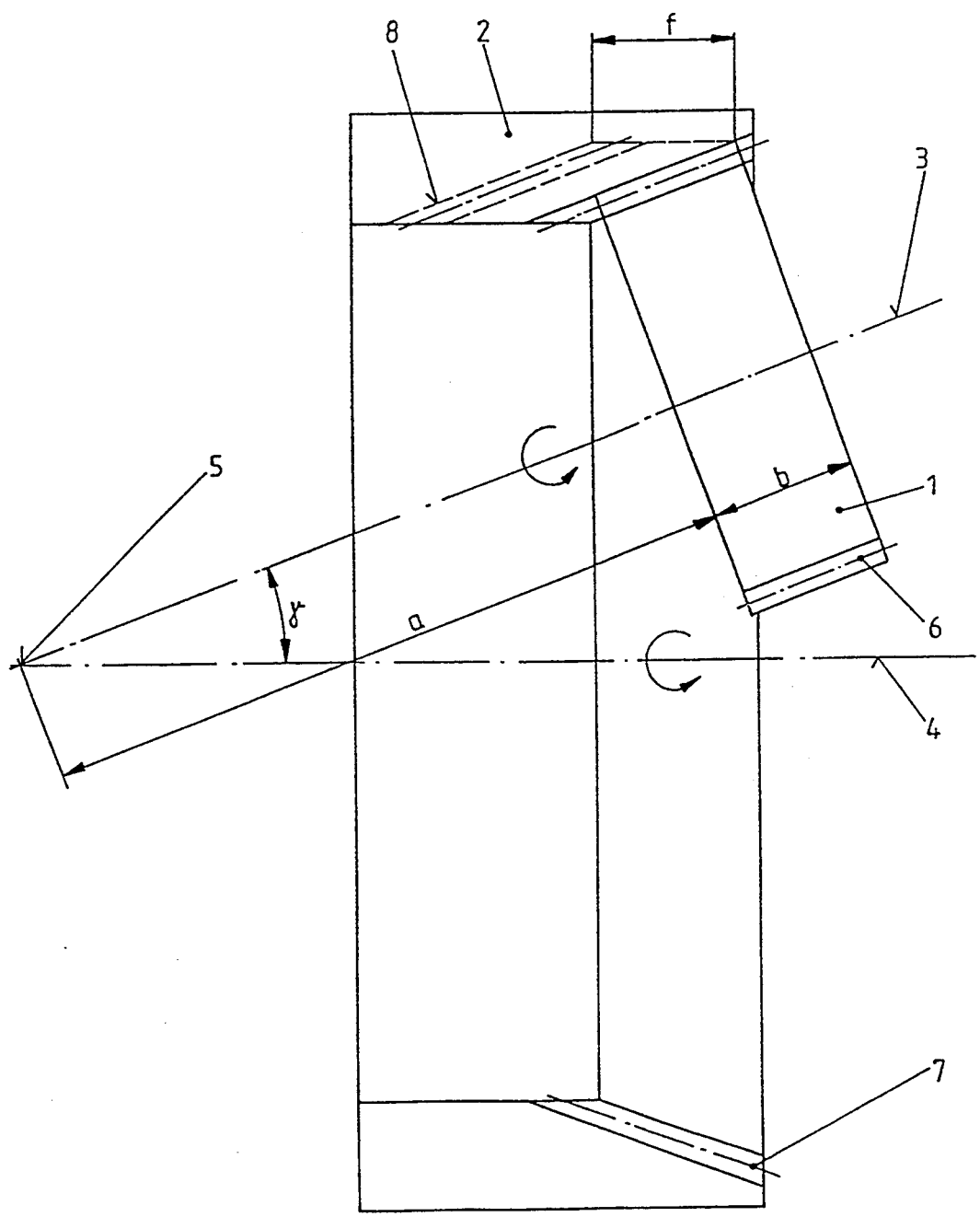
FIG. 1 is a schematic drawing of the relative position between a spur gear tool and workpiece in accordance with the invention.

FIG. 1 shows the relative position between a workpiece 1 and a tool 2, which is configured as a spur gear with internal teeth. The axis 3 of the workpiece forms an intersection or crossing angle $\gamma$ with the axis 4 of the tool. This angle is greater than 0 degrees, but at most 90 degrees. The distance a of the workpiece 1 from the axial intersection 5 (or from the common normal to the workpiece axis 3 and tool axis 4 respectively) is greater than the width b of the teeth 6 of the workpiece. Thus, the workpiece teeth 6 mesh with the conically toothed section 7 of the spur gear tool 2.

At this stage the infeed movement is no longer vertical to the workpiece axis 3, as in the prior art, but rather parallel to the tool axis 4. Even the infeed movement necessary during dressing or re-profiling with a diamond coated spur gear is parallel to the tool axis 4. In this manner the tool teeth 7 are moved by repeated dressing to the left, e.g. into the position 8, shown with the dashed line. The cumulative dressing or infeed amount is denoted as f. Since the intersection of workpiece axis 3 and tool axis 4 has moved to the left by the same amount f, the tooth geometry of the tool 2 meshing with the workpiece 1 has not changed; profile displacements are thus totally avoided. In this manner a constant finishing is guaranteed. The maximum amount of dressing is thus no longer limited by the tooth geometry, but rather depends only on the width of the tool 2, which can be freely selected over a wide range.

Figure 2:
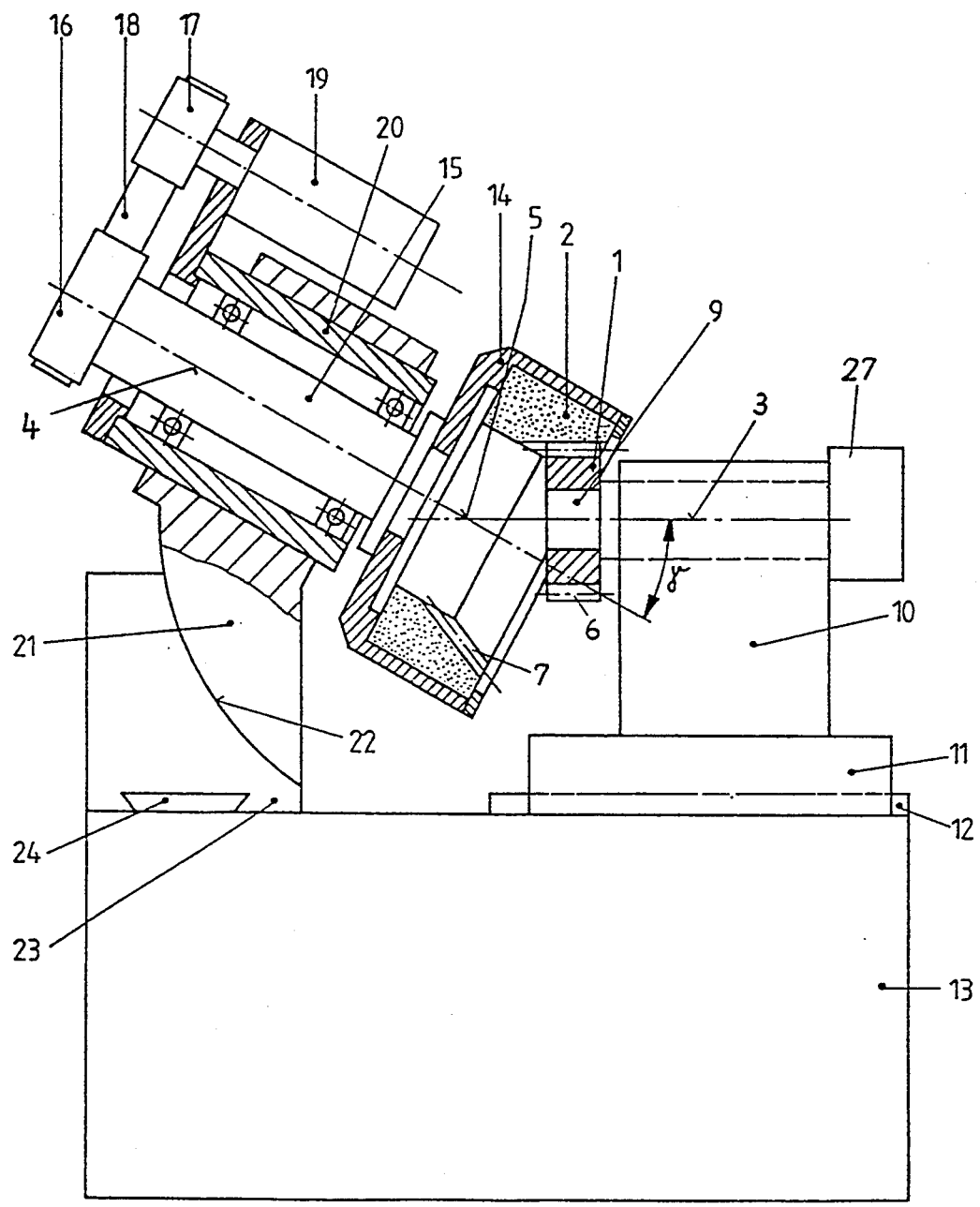
FIG. 2 is a schematic elevation, in partial section, of an embodiment of a spur gear machining apparatus of the invention.

FIG. 2 shows an apparatus or machine having the subassemblies necessary to achieve the relative position and movement of the tool 2 and workpiece 1 according to FIG. 1.

The spur gear workpiece 1 is mounted on a spindle 9, which can be rotated on bearings (not illustrated) in a housing 10. The housing is mounted on a carriage 11, which in turn can be moved on guides 12 relative to the machine bed 13 parallel to the workpiece axis 3. The tool 2 is connected by means of a holder 14 to the tool spindle 15, which is driven by a motor 19 via pulleys 16 and 17 and a belt 18. The spindle 15 can be rotated in a sleeve 20. The sleeve 20 can be adjusted axially in the direction of the axis 4 in a swivel housing 21, e.g. by means of a hydraulic cylinder (not shown). The swivel housing can be adjusted in a circular guide 22 around the axial intersection 5, thus modifying the angle $\gamma$ of axial crossing or intersection.

The carriage 23 accommodating the swivel housing 21 by means of the guide 22 can be moved on a cross slide 24 parallel to the common normal of the workpiece axis 3 and the tool axis 4, thus resulting in the aforementioned axial component of the relative movement in the meshing circle when the teeth of the tool 2 and workpiece 1 mesh.

The machining can take place with two flank contact between the workpiece 1 and the tool 2, in which case the workpiece spindle 9 can be freely rotated. However, machining can also be done with one flank contact. To this end, the spindle 9 is connected to an adjustable brake 27. Motor 19 and brake 27 can also be interchanged, so that the workpiece spindle 9 is driven and the tool spindle 15 is either braked or can be freely rotated. With one flank contact the motor 19 can be driven in both directions of rotation.

To dress the spur gear tool 2, a diamond or cubic boron nitride-coated dressing spur gear, instead of the spur gear workpiece 1, is clamped on the spindle 9. The dressing spur gear has the same tooth geometry as the gear 1 to be ground, but is expediently somewhat wider. The dressing-in-feed is again in the direction of the tool axis 4.

I claim:

1. An apparatus for fine machining tooth flanks of a cylindrical spur gear, comprising a workpiece spindle (9) rotatable around a workpiece axis (3) for clamping a spur gear workpiece (1), and a tool spindle (15) rotatable around a tool axis (4) for clamping a toothed spur gear grinding tool (2) wherein teeth (7) of the tool are defined on a conical surface, wherein the workpiece axis and tool axis cross at an acute angle ($\gamma$), and wherein the tool spindle is fed relative to the workpiece spindle in the direction of the tool axis to accomplish a machining process on the spur gear.

2. An apparatus as claimed in claim 1, wherein the teeth of the tool are configured with a sufficient width such that they engage along the entire width (b) of the spur gear workpiece during machining.

3. An apparatus as claimed in claim 2, wherein the angle ($\gamma$) between the two axes is adjustable.

4. An apparatus as claimed in claim 1 wherein, when the two axes are skewed, the distance between the two axes is adjustable.

5. An apparatus as claimed in claim 1, wherein a common line (5) normal to the two axes extends laterally outside the tool teeth.

6. An apparatus as claimed in claim 1, wherein the workpiece spindle can be moved relative to the tool spindle along the workpiece axis.

7. An apparatus as claimed in claim 1, wherein the tool has internal teeth.

8. An apparatus as claimed in claim 1, wherein the tool is a grinding gear with hard material grains bonded into a matrix.

9. An apparatus as claimed in claim 1, wherein one (9) of the two spindles is connected to a brake (27), and the other spindle (15) is connected to a bidirectional drive motor (19).

10. A method for fine machining tooth flanks of a cylindrical spur gear workpiece (1), comprising the steps of:
    a) mounting the workpiece on a first spindle (9) rotatable about a first axis (3),
    b) mounting a toothed spur gear grinding tool (2) on a second spindle (15) rotatable about a second axis (4), wherein teeth (7) of the tool are defined on a conical surface,
    c) orienting the first and second spindles such that the first and second axes cross at an acute angle ($\gamma$) equal to an angle of conicity of the tool, with the tool teeth meshing with teeth (6) of the workpiece,
    d) rotating one of the first and second spindles, and
    e) simultaneously with step d), feeding the tool toward the workpiece in a direction of the second axis.

11. A method for dressing a toothed spur gear grinding tool (2), wherein teeth (7) of the tool are defined on a conical surface, comprising the steps of:
    a) mounting a toothed dressing spur gear on a first spindle (9) rotatable about a first axis (3), said dressing spur gear being coated with grains of diamond or cubic boron nitride and having tooth shapes corresponding to those of a spur gear workpiece to be fine machined by the grinding tool,
    b) mounting the grinding tool on a second spindle (15) rotatable about a second axis (4),
    c) orienting the first and second spindles such that the first and second axes cross at an acute angle ($\gamma$) equal to an angle of conicity of the tool, with the tool teeth meshing with teeth (6) of the dressing spur gear,
    d) rotating one of the first and second spindles, and
    e) simultaneously with step d), feeding the tool toward the dressing spur gear in a direction of the second axis.

* * * * *